(12) United States Patent
Johansson et al.

(10) Patent No.: US 6,422,269 B1
(45) Date of Patent: Jul. 23, 2002

(54) MULTILAYER PLASTIC PIPE AND ITS USE

(75) Inventors: Bengt Johansson, Valling; Yngve Lundequist, Enebbavägen; Rauno Asplund, Trädgårdsgatan, all of (SE)

(73) Assignee: Wirsbo Bruks AB, Virsbo (SE)

( * ) Notice: Subject to any disclaimer, the term of this patent is extended or adjusted under 35 U.S.C. 154(b) by 0 days.

(21) Appl. No.: 09/646,609

(22) PCT Filed: Mar. 18, 1999

(86) PCT No.: PCT/SE99/00429
§ 371 (c)(1),
(2), (4) Date: Sep. 20, 2000

(87) PCT Pub. No.: WO99/49254
PCT Pub. Date: Sep. 30, 1999

(30) Foreign Application Priority Data

Mar. 23, 1998 (SE) .............................................. 9800967

(51) Int. Cl.$^7$ ............................................... F16L 11/00
(52) U.S. Cl. ...................... 138/137; 138/140; 138/141
(58) Field of Search .................. 138/137, 140, 138/141, DIG. 8, DIG. 7

(56) References Cited

U.S. PATENT DOCUMENTS

| | | | | |
|---|---|---|---|---|
| 4,593,853 A | * | 6/1986 | Schad et al. ................. | 237/56 |
| 4,614,208 A | * | 9/1986 | Skarelius ................. | 138/137 X |
| 4,713,296 A | * | 12/1987 | Aoyama et al. ............. | 428/412 |
| 5,472,754 A | * | 12/1995 | Douchet et al. ......... | 428/36.91 |
| 5,866,214 A | * | 2/1999 | Ramesh ...................... | 428/34.8 |
| 5,869,573 A | * | 2/1999 | Kuroda et al. ................. | 525/66 |

FOREIGN PATENT DOCUMENTS

| | | |
|---|---|---|
| DE | 31 04 161 | 8/1982 |
| DE | 33 19 515 | 11/1984 |
| EP | 0 030 091 | 6/1981 |
| EP | 0 682 758 | 11/1995 |
| EP | 0 725 908 | 8/1996 |
| SE | 500 665 | 8/1994 |
| SE | 9303295 | 3/1995 |

* cited by examiner

*Primary Examiner*—Patrick Brinson
(74) *Attorney, Agent, or Firm*—Browdy and Neimark, P.L.L.C.

(57) ABSTRACT

The invention relates to a multilayer plastic pipe (1), preferably for use in heating systems. The multilayer pipe comprises an inner core (2) and a barrier layer (6) surrounding the core and preventing oxygen diffusion through the multilayered pipe. The core (2) is made of a material having viscoelastic properties, preferably cross-linked polyethylene, and the barrier layer (6) is surrounded by an outer layer (8) of a material having adhesive properties. The invention also relates to the use of a multilayer pipe for providing pipe couplings.

16 Claims, 1 Drawing Sheet

MULTILAYER PLASTIC PIPE AND ITS USE

CROSS REFERENCE TO RELATED APPLICATION

The present application is the national stage under 35 U.S.C. 371 of PCT/SE99/00429, filed Mar. 18, 1999.

FIELD OF THE INVENTION

The present invention relates to a multilayer plastic pipe, preferably intended for water piping in central heating systems. The multilayer pipe comprises an inner core and an outer barrier layer which is surrounding the inner core and is made of a material which prevents oxygen diffusion through the multilayered pipe. The invention also relates to the use of a multilayer plastic pipe.

BACKGROUND OF THE INVENTION

Plastic pipes have previously been used, for example, for water distribution. Such pipes are preferably made of polyolefins, such as cross-linked polyethylene (PEX), polypropene or polybutylene. Plastic pipes which are to be used for water distribution in heating systems, such as for example, those for floor heating or for radiator systems, must be provided with an oxygen barrier layer so as to prevent oxygen diffusion into the water and thus causing corrosion on the metal components which are part of the heating systems.

In order to prevent oxygen diffusion through the pipe, it is a commonly used method to coat the outer surface of the pipe with a barrier layer of a material which prevents diffusion, such as for example, ethylene vinyl alcohol (EVOH). An intermediate layer of an adhesive material, an adhesive layer, may be provided between the inner core and the barrier layer, said intermediate layer being effective to create or to increase the adhesion between the inner core, such as a PEX-pipe, and the outer barrier layer.

An advantageous technique for connecting plastic pipes with different types of couplings and fittings in water distribution systems is previously known, i.a. from SE-C2-500665 and SE-C2-501555. The described technique is used for pipe couplings for plastic pipes having viscoelastic properties, or memory properties, i.e. plastic pipes having a tendency to automatically shrink back to their original shape after, for instance, an expansion. A pipe material having this property is, for example, cross-linked polyolefin, especially cross-linked polyethylene (PEX). The mechanical properties of the material allows a deformation of the pipe at temperatures as low as at least −20° C. In order to mount the plastic pipe on the pipe coupling, the end of the plastic pipe is expanded and a nipple is inserted into the expanded end of the pipe and is kept in the pipe until the pipe end shrinks back over the nipple. This known technique is advantageous as it is quick and easy to preform and provides a safe and water-tight coupling.

In accordance with the technique described above, the pipes are substantailly expanded in a radial direction. This has proven to function very satisfactorily when PEX-pipes are being used. However, this advantageous coupling technique is disadvantageous when it is used on pipes having an oxygen barrier layer as described above. In the process of an substatial, radial expansion of the pipe, cracks may appear in the outer barrier layer, said cracks occurring especially at low temperatures, such as temperatures below about 15° C. The cracks which occur in the barrier layer have shown a tendency to propagate into the pipe wall during the expansion process of the pipe, thus causing pipe fractures leading to leaking pipe couplings.

Attempts have been made to solve the above problem by modifying know barrier materials. The object has been to try to find modified barrier materials which may withstand an expansion without cracking. So far, a modified barrier material which provides an acceptable solution to the expansion cracking problem has not been found.

SUMMARY OF THE INVENTION

The object of the present invention is thus to provide a solution to the above problem, in that the advantageous coupling technique may be used on the plastic pipes which are specially made for use in heating systems.

This object has been achieved according to the invention by means of a multilayer plastic pipe having the characterizing features as defined in the claims.

The inventive solution provides the advantage that the advantageous coupling technique, which is quick, efficient and inexpensive, may be applied to a hole range of different pipes. This means that plumbers working with installations at the site do not require different couplings for different types of pipes, but may instead use just one type of couplings.

According to the invention the problem has been solved by coating the plastic multilayer pipe with an additional layer of an adhesive material, an adhesive layer. The adhesive layer may consist of the same or similar material as the intermediate adhesive layer which is applied between the inner core and the barrier layer so as to increase the adhesion between the layers. The inventive multilayer pipe which is coated with an outer adhesive layer can be radially expanded without crack formation occurring in the barrier layer or in other parts of the pipe wall.

In a plastic pipe having an outer layer, such as a barrier layer, stress concentrations naturally occur especially in the outer layer, when the pipe is expanded. Therefore, stress cracks appear mainly in the outer layer and these cracks may propagate, as described above, into the pipe wall during the expansion of the pipe and cause pipe fractures. According to the invention the outer barrier layer is coated with an additional layer which in itself is sufficiently pliable to absorb stress concentrations and which also adheres to the brittle barrier layer such that this layer is "supported". This prevents or reduces the tendency to form cracks in the pipe wall.

The mechanical properties of crystalline materials, and also of semi-crystalline materials such as for example EVOH, depend among other things upon the crystalline structure of the material. The crystalline structure is dependent upon the rate of crystallisation, i.e. the cooling rate. On extrusion of a plastic pipe with a barrier layer, the outer layer is exposed directly to ambient air outside the extruder die. An extruded pipe with no additional outer layer is subjected to rapid cooling and crystallisation. On extrusion of a pipe having an outer adhesive layer according to the invention, the cooling of the barrier layer is slower and the thus obtained crystalline structure of said barrier layer has improved mechanical properties.

The barrier layer of a pipe with no additional outer layer is directly exposed to air when it leaves the extruder die at a temperature of above 200° C. An oxidative degradation of the barrier layer takes place at this stage which deteriorates the mechanical properties of-the material. In a pipe coated with an additional layer outside the barrier layer according to the invention, the outer layer protects the barrier layer against said degradation during the cooling period and therefor the mechanical properties of the barrier layer is improved.

BRIEF DESCRIPTION OF THE DRAWING

The invention is described in more detail below with reference to the accompanying drawing showing by way of example a preferred embodiment of the invention.

DETAILED DESCRIPTION OF THE INVENTION

Figure 1:
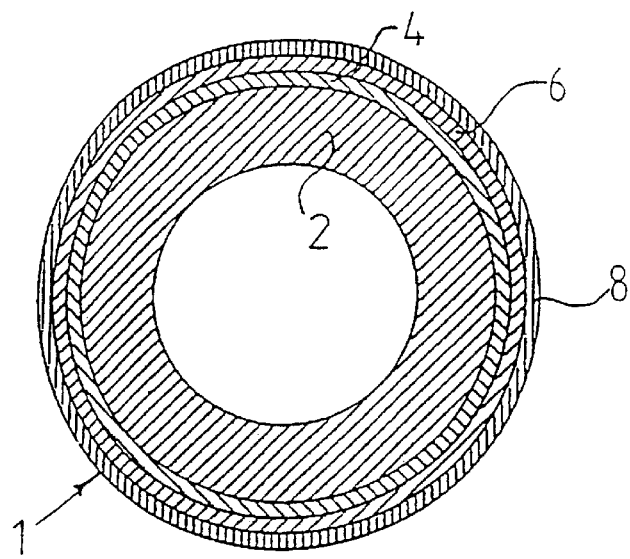
FIG. 1 is a cross-sectional view of a multi-layer pipe according to the invention.

FIG. 1 illustrates a cross-section of a preferred embodiment of a multilayer plastic pipe in accordance with the invention. The multilayer pipe 1 comprises an inner core 2 which is made of cross-linked polyolefin, preferably a cross-linked polyethylene, a PEX-pipe. The inner core 2 is made of a material having viscoelastic or memory properties, i.e. a material which after expansion tends automatically to retain to its original shape.

A barrier layer 6 is arranged on the outside of the inner core 2 in order to prevent oxygen diffusion through the pipe 1. The material of the barrier layer 6 is preferably ethylene vinyl alcohol (EVOH), which is a material which is commonly used as an oxygen barrier. Different modified variants of EVOH may also be used as barrier layers. Other known barrier materials preventing oxygen diffusion through the pipe may also be used as barrier layer within the scope of the invention.

Figure 2:
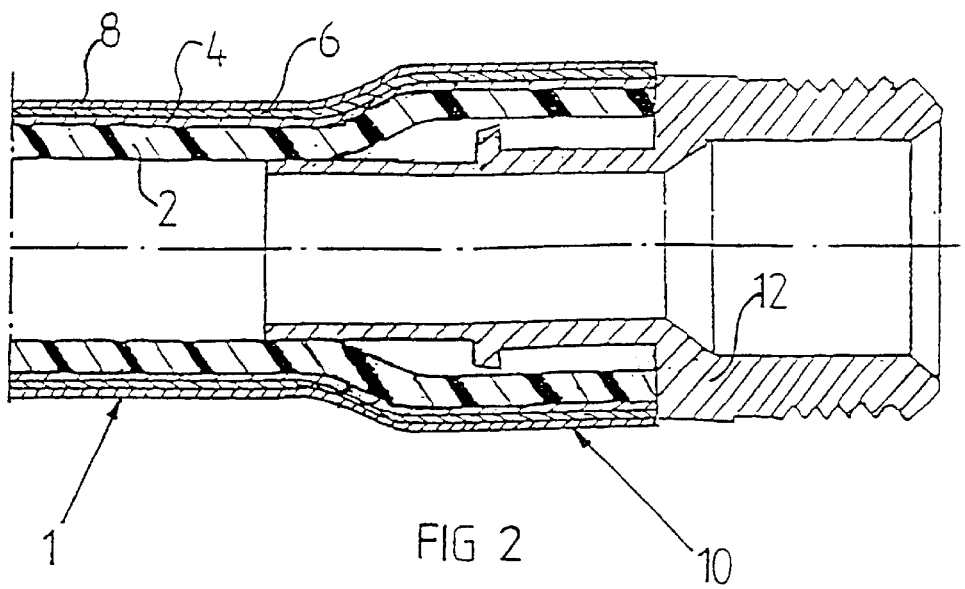
FIG. 2 is an axial cross-section of an expanded multilayer pipe according to FIG. 1 with an inserted nipple.
Figure 3:
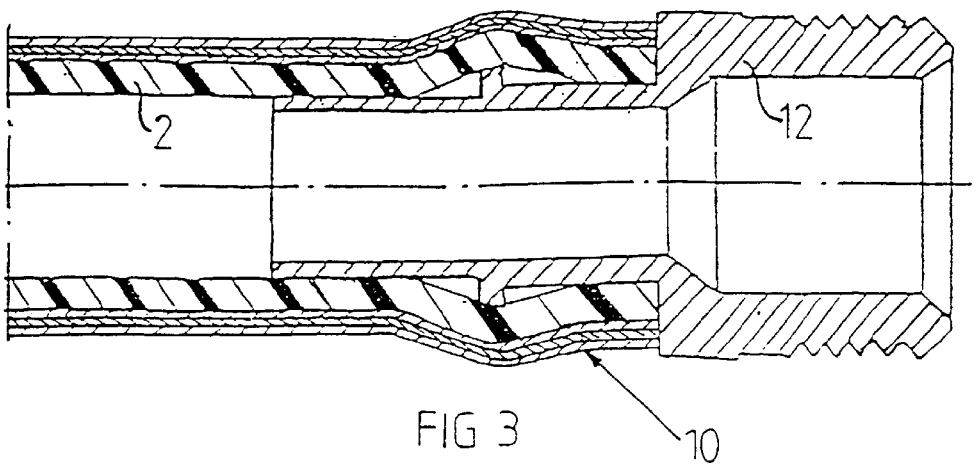
FIG. 3 shows the multilayer pipe according to FIG. 2 which shrinks over the nipple.

The barrier layer 6 is arranged outside the inner core 2, preferably and in the embodiment of FIGS. 1–3, with an intermediate layer 4 between the barrier layer 6 and the inner core 2 of an adhesive material, an adhesive layer. The intermediate adhesive layer 4 is arranged in order to create or improve the adhesion between the inner core 2 and the barrier layer 6 of the multilayer pipe. The material of the adhesive layer may be any of the well know and easily available products on the market having the property to adhere to the materials of the inner core 2 and the barrier layer 6. The material of the adhesive layer is preferably a modified polyethylene, such as for example a maleic anhydride modified polyethylene.

According to the invention, an additional layer 8 is arranged on the outside of the barrier layer 6. The outer layer 8 is an adhesive layer of the same or similar material to that of the intermediate adhesive layer 4 between the inner core 2 and the barrier layer 6. Within the scope of the invention, the material of the intermediate adhesive layer 4 and the outer adhesive layer 6, respectively, may of course consist of completely different materials having adhesive properties.

In accordance with a preferred embodiment of the invention, the wall thickness of the inner core 2 is about 1,5–25 mm, preferably about 1,8–5 mm, whilst the three outer layers 4, 6, 8 are relatively thin and have similar wall thicknesses. According to the preferred embodiment, the intermediate adhesive layer 4 has a wall thickness of about 25–250 μm, preferably 50–100 μm, and the surrounding barrier layer 6 has a wall thickness of about 25–250 μm, preferably 50–125 μm. According to the preferred embodiment, the thickness of the outer adhesive layer 8 is about 25–250 μm, preferably 50–100 μm.

FIG. 2 illustrates an axial cross-section of the multilayer pipe 1 according to FIG. 1. The end part 10 of the pipe 1 has been expanded by an expander tool, which is not shown. A pipe coupling or a nipple 12, for example made of metal or plastic, is partly inserted into the expanded end 10 of the pipe.

An external lock ring, not shown, of elastic material, e.g. of the same material as the inner core, may be arranged on the outside of the end part 10 of the pipe as a reinforcement and may be expanded together with said end part 10.

FIG. 3 illustrates how the expanded end part 10 of the pipe 1 tends to resume its original shape and shrinks onto the nipple 12. The pipe end 10 shrinks quickly and without external influence thus providing a safe and tight joint between the inside of the pipe end 10 and the outside of the inserted part of the nipple 12.

The multilayer pipe 1 has a flexible outer layer 8 which adhere to the brittle barrier layer 6. The pipe end 10 may therefor be exposed to a rapid and substantial radial extension, as illustrated in FIG. 2, without crack formation or propagation occuring in any of the outer layers or in other parts of the multi-layer pipe.

It will be understood that the invention is not restricted to the aforedescribed and illustrated embodiment and that several modifications are conceivable within the scope of the following claims. In the illustrated embodiment a barrier layer is surrounded by an inner and an outer adhesive layer, respectively. It is understood, however, that the inner adhesive layer 4 may be omitted or optionally replaced by modified barrier layer having properties which compensates the properties of the intermediate adhesive layer.

What is claimed is:

1. A multiplayer plastic pipe, preferably for use in heating systems and comprising an inner core (2) of a material having viscoelastic properties, and a barrier layer (6) surrounding the inner core and preventing oxygen diffusion through the multilayer pipe, characterized in that the multilayer pipe is radially expansible, and that the barrier layer (6) is surrounded by an outer layer (8) made of a material having adhesive properties, said adhesive outer layer forming the outermost layer of the multilayer pipe.

2. A multilayer pipe in accordance with claim 1, characterized in that an intermediate layer (4) of an adhesive material is arranged between the inner core (2) and the barrier layer (6).

3. A multilayer pipe in accordance with claim 1, characterized in that the material of the barrier layer (6) is ethylene vinyl alcohol.

4. A multilayer pipe in accordance with claim 1, characterized in that the material of the barrier layer (6) is a modified ethylene vinyl alcohol.

5. A multilayer pipe in accordance with claim 1, characterized in that the adhesive material is a modified polyethylene.

6. A multilayer pipe in accordance with claim 1, characterized in that the wall thickness of the inner core (2) is 1,5–25 mm, that the wall thickness of the barrier layer (6) is 25–250 μm, and that the wall thickness of the outer adhesive layer (8) is 25–250 μm.

7. A multilayer pipe in accordance with claim 2, characterized in that the wall thickness of the intermediate adhesive layer (4) is 25–250 μm.

8. A method for providing a pipe coupling by
   radial expansion of a plastic pipe and subsequent shrinking of the pipe onto a nipple (12),
   characterized in that the pipe is a multilayer plastic pipe comprising an inner core (2) and a barrier layer (6)

surrounding the inner core and preventing oxygen diffusion through the multilayer pipe and that the barrier layer is provided with an outer layer (8) of adhesive material forming the outermost layer of the pipe.

9. The method in accordance with claim 8, characterized in that the multilayer pipe (1) is provided with an intermediate layer (4) of an adhesive material between the inner core (2) and the barrier layer (6).

10. The multilayer pipe of claim 5 wherein said modified polyethylene is maleic anhydride modified polyethylene.

11. The multilayer pipe in accordance with claim 2 wherein at least one of said adhesive outer layer and said intermediate layer is a modified polyethylene, and said barrier layer is ethylene vinyl alcohol or a modified ethylene vinyl alcohol.

12. The multilayer pipe in accordance with claim 6 wherein the wall thickness of the inner core is 1.8–5 mm, the wall thickness of the barrier layer is 50–125 $\mu$m, and the wall thickness of the outer adhesive layer is 50–100 $\mu$m.

13. The multilayer pipe in accordance with claim 2 wherein the wall thickness of the inner core is 1.8–5 mm, the wall thickness of the barrier layer is 50–125 $\mu$m, and the wall thickness of the outer adhesive layer is 50–100 $\mu$m.

14. A multilayer pipe in accordance with claim 13, wherein in that the wall thickness of the intermediate adhesive layer (4) is 25–250 $\mu$m.

15. The multilayer pipe in accordance with claim 14, wherein the wall thickness of the intermediate adhesive layer is 50–100 $\mu$m.

16. The multilayer plastic pipe of claim 1 wherein said inner core is of cross-linked polyethylene.

* * * * *